United States Patent

Oh-Oka

[15] 3,660,048
[45] May 2, 1972

[54] PRELIMINARY FREQUENCY REGULATING METHOD FOR REGULATORS OF WATCH MECHANISMS

[72] Inventor: Mitsuo Oh-Oka, Tokorozawa, Japan
[73] Assignee: Citizen Watch Co., Ltd., Tokyo, Japan
[22] Filed: Apr. 21, 1970
[21] Appl. No.: 30,539

[30] Foreign Application Priority Data

Sept. 5, 1969    Japan....................................44/70440

[52] U.S. Cl.........................................29/178, 58/109, 73/6
[51] Int. Cl.......................................................B23p 13/00
[58] Field of Search ..............29/177, 178, 173, 407; 58/109, 58/28; 73/6

[56] References Cited
UNITED STATES PATENTS 3,020,682   2/1962   Spetzler et al. .......................29/178 X

FOREIGN PATENTS OR APPLICATIONS 351,228   2/1961   Switzerland ..............................29/178
351,229   2/1961   Switzerland ..............................29/178

Primary Examiner—John F. Campbell
Assistant Examiner—Victor A. Di Palma
Attorney—William D. Hall, Elliott I. Pollock, Fred C. Philpitt, George Vande Sande, Charles F. Steininger and Robert R. Priddy

[57] ABSTRACT

A flange is provided on the rim of a balance so that the preliminary frequency regulation may be attained by cutting said flange, with a balance spring mounted on the balance. At least three markings are provided on the peripheral surface of the rim so that a true frequency may be detected without being influenced by an amplitude change.

3 Claims, 1 Drawing Figure

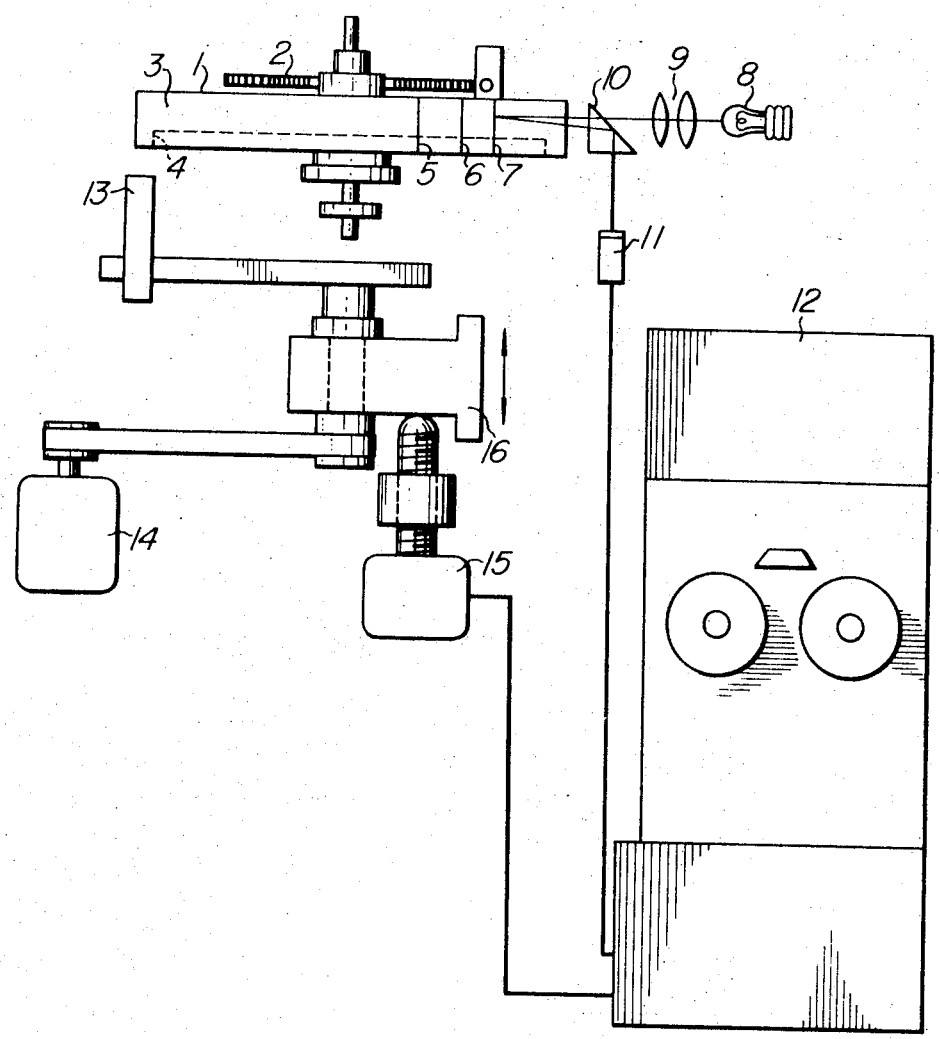

PRELIMINARY FREQUENCY REGULATING METHOD FOR REGULATORS OF WATCH MECHANISMS

The present invention relates to a preliminary frequency regulating method for the regulators of watch mechanisms, by which the frequency of an oscillation system for use in a portable watch, consisting of a balance and a balance spring, is regulated approximately close to a prescribed value, mainly for the purpose of enabling the following final regulation of frequency to be performed in a rational manner.

In the past, a method was used in which a balance and a balance spring were assembled and the balance spring was wound up until a predetermined frequency was obtained. However, this method had the disadvantage that displacement of the fixed outer end of the balance spring adversely affects the isochronism of the oscillation system. For this reason, there has already been developed a method in which balance springs and balances are sorted in terms of spring constant and moment of inertia respectively, and a balance spring and a balance of the same class are combined to obtain an approximate frequency. This method, however, is not adapted for mass production of oscillation systems at low cost.

There has also been used a method in which holes are bored or recesses are formed by milling in the rim of a balance symmetrically with respect to the center of said balance, with a balance spring mounted thereon, so as to obtain a frequency approximating a prescribed one. In this method, however, special consideration must be given so that holes or slits to be formed in the following final regulation do not coincide with the positions of the holes or recesses already formed, and consequently the balance necessarily has machining at least three locations upon completion of the final regulation.

The present invention provides a method of approximately bringing the frequency of an oscillation system, consisting of a balance and a balance spring, to a prescribed value by cutting the rim of the balance circumferentially thereof. The method of this invention enables the following final regulation, i.e. the removal of weight unbalance and regulation of the oscillation system to the prescribed frequency, to be attained by machining the rim of the balance at two locations only which are symmetrical with respect to the center of the balance in a direction in which the limiting value of the positional difference is had.

Namely, according to the present invention the rim of the balance is uniformly cut over the entire circumference thereof and the amount of cutting is regulated only by the amount of feeding of a cutting tool. Therefore, upon completion of the preliminary regulation, the rim has a uniform shape over the entire circumference thereof and the working of the rim at the time of the primary regulation can be effected at any selected location of the outer peripheral edge portion of the rim, so that the primary regulation is not subjected to any restriction and the frequency regulation can be achieved readily and rationally.

In the preliminary regulation according to the present invention, the cutting of the balance is effected with the balance spring mounted thereon. Therefore, the frequency can be regulated with high accuracy by the preliminary regulation and, by providing a relatively narrow flange around the periphery of the rim, the amount of cutting can be minimized and a minute regulation becomes possible. Namely, the rim generally has a simple rectangular cross section and if the rim is cut on one side thereof, the irregularity in cutting depth caused by the mechanical cutting operation will adversely affect largely the accuracy of the preliminary frequency regulation. However, when a ring-shaped flange, smaller in width than the width of the rim, is formed on the rim and the preliminary regulation is effected by cutting said flange, there can be obtained the advantage that a working error of as slight as ± 2 becomes allowable for obtaining a regulation accuracy of ± 1 minute.

It is well known in the art that the frequency of an oscillation system consisting of a balance and a balance spring is measured by providing markings on the rim of the balance at two locations, imparting a free damped oscillation to the oscillation system to optically measure the frequency corresponding to a predetermined amplitude and converting the optically detected frequency into an electric signal. However, since the two markings are provided on both sides of an optical axis, a change in amplitude in the period of measurement due to damping, etc. results in displacement of the phase and, in order to obtain a true frequency, it becomes necessary to correct the detected data by a function of the amplitude change.

In the present invention a marking is attached to the rim at the focus of the optical axis while holding the balance stationary, and an error resulting from an amplitude change is eliminated, utilizing said marking in the detection of frequency. Further, two markings are provided each on each side of the above-mentioned marking, for use in the detection of amplitude. Thus, the balance in the present invention is characterized by three or more markings provided on the rim thereof.

The preliminary regulation according to the present invention of systems carried out by a series systems which measures the period at a predetermined amplitude of an oscillation system in the manner described during the damped oscillation of said system, converts the period into an electric signal, performs a calculation according to a predetermined program and converts the calculation result into a quantity of mechanical movement, thereby controlling the cutting quantity.

The above-described method utilizing three markings is applied to the regulation of the isochronism of amplitude, the regulation of a positional difference, the regulation of a frequency to a prescribed value, the regulation of an uneven oscillation and the inspection of amplitude, and are useful for rationalizing any and all operations concerning speed regulation. A light is applied to the side surface of the rim and the reflecting light is received by a light-electricity converter to generate an electric signal. This signal is converted into an amplitude signal and a frequency signal. On the other hand, pulses from a quartz oscillator are supplied to count the durations of said amplitude signal and said frequency signal by said pulses.

By setting the amplitude at 250°, the pulses contained in the amplitude signal can be set at a predetermined value. When the amplitude pulse has reached a predetermined level, the duration of the frequency signal is counted in terms of pulse and the counting is terminated at the same time when the frequency signal terminates. The number of the pulses thus counted corresponds to the period and the frequency can be readily determined as a reverse number of said period.

A preferred embodiment of the present invention will be described with reference to the accompanying drawing which is a schematic illustration of an apparatus used for practicing the method of this invention.

Referring to the drawing, a balance spring 2 which is fixed at one end is connected to a balance 1 to impart a damped oscillation thereto. The rim 3 of the balance is provided with a flange 4 to be cut and also with three markings 5, 6 and 7 on the peripheral surface thereof. An arrangement is made such that a light from a light source 8 is condensed by a lens 9, reflected on the peripheral surface of the rim 3 and totally reflected by a prism 10 to illuminate a light-electricity converter 11. During the damped oscillation of the balance 1, the reflecting light beam is disturbed by the markings 5, 6 and 7 when said markings pass the axis of the light from the light source 8, giving an input signal to an electronic computer 12 through the light-electricity converter 11. Reference numeral 13 designates a swivel tool driven from an electric motor 14. The center of revolution of the swivel tool 13 is coaxial with the balance 1. This swivel tool 13 revolves along the flange 4 of the balance 1 while cutting said flange uniformly over the entire circumference thereof.

Further, as will be apparent from the drawing, the swivel tool 13 has a cutting edge wider than the width of the flange 4, so that it cuts the flange 4 uniformly flatly and the flange 4 thus cut has a flat cut surface which is suitable for the subsequent final regulation. The electronic computer 12 carries out a calculation according to a predetermined program, based on the input signal and controls a pulse motor 15 in such a manner as to provide for cutting of a suitable quantity. A mount 16 for the tool 13 is fed by the pulse motor 15 and the flange 4 is cut by the tool 13, whereby the preliminary regulation is automatically achieved.

Although in the embodiment described, the markings 5, 6 and 7 are provided on the peripheral surface of the rim 3 of the balance, it is to be noted that these markings may be provided on an end face of the rim.

I claim:

1. A preliminary frequency regulating method for regulators, particularly for balance-balance spring type regulators, of watch mechanisms comprising, optical measuring means, frequency comparing means, swivel cutting means and controlling means: said method comprising, freely oscillating the balance-balance spring type regulator with said balance spring mounted on said balance and with the outer end of said balance spring being fixed, measuring the frequency of said balance-balance spring type regulator by said optical measuring means, comparing said frequency with a reference frequency by said frequency comparing means, and cutting the rim of said balance over the entire circumference thereof by said swivel cutting means while controlling said swivel cutting means by signals supplied thereto from said frequency comparing means through said controlling means.

2. A method as defined in claim 4, wherein said swivel cutting means is a cutting tool having a cutting edge of a width larger than the width of the surface to be cut of said rim, by which said rim is cut flatly.

3. A method as defined in claim 1, wherein at least three markings to be read by said optical measuring means are provided on the outer peripheral surface of said balance.

* * * * *